US012686803B2

(12) United States Patent
Oshiumi et al.

(10) Patent No.: US 12,686,803 B2
(45) Date of Patent: Jul. 21, 2026

(54) THERMALLY CONDUCTIVE FILLER, THERMALLY-CONDUCTIVE COMPOSITE MATERIAL, WIRE HARNESS, AND METHOD FOR MANUFACTURING THERMALLY CONDUCTIVE FILLER

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); KYUSHU UNIVERSITY, NATIONAL UNIVERSITY CORPORATION, Fukuoka (JP)

(72) Inventors: Naoyuki Oshiumi, Yokkaichi (JP); Takehiro Hosokawa, Yokkaichi (JP); Kazuo Nakashima, Yokkaichi (JP); Hironobu Rachi, Yokkaichi (JP); Takashi Kawakami, Yokkaichi (JP); Yusaku Maeda, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 617 days.

(21) Appl. No.: 18/029,870

(22) PCT Filed: Oct. 8, 2021

(86) PCT No.: PCT/JP2021/037265
§ 371 (c)(1),
(2) Date: Mar. 31, 2023

(87) PCT Pub. No.: WO2022/085477
PCT Pub. Date: Apr. 28, 2022

(65) Prior Publication Data
US 2023/0365852 A1 Nov. 16, 2023

(30) Foreign Application Priority Data
Oct. 20, 2020 (JP) ................................. 2020-176248

(51) Int. Cl.
| | |
|---|---|
| C03C 17/00 | (2006.01) |
| C03C 17/32 | (2006.01) |
| C08K 7/06 | (2006.01) |
| C08K 7/28 | (2006.01) |
| C08K 9/02 | (2006.01) |
| C09K 5/14 | (2006.01) |

(52) U.S. Cl.
CPC .............. *C09K 5/14* (2013.01); *C03C 17/007* (2013.01); *C03C 17/32* (2013.01); *C08K 7/06* (2013.01); *C08K 7/28* (2013.01); *C08K 9/02* (2013.01); *C03C 2217/445* (2013.01); *C03C 2217/475* (2013.01); *C03C 2217/48* (2013.01); *C03C 2218/113* (2013.01); *C08K 2201/001* (2013.01); *C08K 2201/002* (2013.01)

(58) Field of Classification Search
CPC ... C08K 7/06; C08K 7/28; C08K 9/02; C08K 9/08; C08K 9/04; C08K 2201/001; C08K 2201/002; C03C 11/002; C03C 17/007; C03C 17/32; C03C 2217/465; C03C 2217/445; C03C 2217/475; C03C 2217/48; C03C 2218/113; C08L 101/00
USPC ............................................. 252/74, 73, 71
See application file for complete search history.

(56) References Cited

FOREIGN PATENT DOCUMENTS

| | | | |
|---|---|---|---|
| CN | 103756252 A | | 4/2014 |
| JP | 06254380 A | * | 9/1994 |
| JP | H06-254380 A | | 9/1994 |
| JP | H09-321185 A | | 12/1997 |
| JP | 2003-221453 A | | 8/2003 |
| JP | 2010013580 A | * | 1/2010 |
| JP | 2011-225882 A | | 11/2011 |

(Continued)

OTHER PUBLICATIONS

Isobe, JP 06-254380 Machine Translation, Sep. 13, 1994 (Year: 1994).*

(Continued)

*Primary Examiner* — Jessica Whiteley
(74) *Attorney, Agent, or Firm* — Oliff PLC

(57) ABSTRACT

A thermally conductive filler can exhibit high thermal conductive properties with a reduced specific gravity, a thermally-conductive composite material and a wire harness contains such a thermally conductive filler, and a method manufactures a thermally conductive filler. A thermally conductive filler contains base particles and a coating layer coating the particles, the coating layer contains a gel-like substance that is bonded to the surfaces of the base particles through chemical bonding and coats the surfaces of the base particles, and a thermally-conductive substance that is dispersed in the layer of the gel-like substance and has a higher thermal conductivity and a larger specific gravity than the base particles and the gel-like substance. Also, a thermally-conductive composite material is obtained by dispersing the thermally conductive filler in a matrix material. Furthermore, a wire harness contains the thermally-conductive composite material.

18 Claims, 2 Drawing Sheets

(56)            References Cited

FOREIGN PATENT DOCUMENTS

| JP | 2012-122057 | A | 6/2012 |
|----|-------------|---|--------|
| JP | 2012-255055 | A | 12/2012 |
| JP | 2014-133678 | A | 7/2014 |
| JP | 2015-108058 | A | 6/2015 |
| JP | 2015-178543 | A | 10/2015 |
| JP | 2019-001849 | A | 1/2019 |
| JP | 2019-123983 | A | 7/2019 |
| JP | 2019-183052 | A | 10/2019 |
| JP | 2020-029524 | A | 2/2020 |

OTHER PUBLICATIONS

Fukaya et al., JP 2010013580 Machine Translation, Jan. 21, 2010 (Year: 2010).*

Dec. 28, 2021 International Search Report issued in International Patent Application No. PCT/JP2021/037265.

Watanabe et al., "Improvement of Dispersibility of Nano-Silica Hollow Particles in Polymer through Surface Modification Treatment," The Society of Chemical Engineers, Japan, The 40th Autumn Meeting Abstracts, K216, Sep. 2008.

Feng, C., "Surface Modification of Hollow Glass Microspheres by Graft Polymerization and Its Application in Polyurethane Composites", Chinese Master's Theses Full-text Database Engineering Science and Technology I, No. 3, 2016, pp. B020-B246.

Jan. 23, 2025 Office Action issued in Chinese Patent Application No. 202180070548.1.

* cited by examiner

[1A]

[1B]

THERMALLY CONDUCTIVE FILLER, THERMALLY-CONDUCTIVE COMPOSITE MATERIAL, WIRE HARNESS, AND METHOD FOR MANUFACTURING THERMALLY CONDUCTIVE FILLER

TECHNICAL FIELD

The present disclosure relates to a thermally conductive filler, a thermally-conductive composite material, a wire harness, and a method for manufacturing a thermally conductive filler.

BACKGROUND ART

A thermally conductive filler may be added to an organic polymer material for the purpose of enhancing heat dissipation properties and reducing the influence of heat generation caused by the application of an electric current or the like in an insulating member included in an electric/electronic component. The thermally conductive filler generally includes an inorganic compound having high thermal conductive properties, such as alumina, aluminum nitride, or boron nitride.

In recent years, various electric/electronic components such as car electronics have been made more adaptable to large electric currents and have become more integrated, and the amount of heat generated due to the application of an electric current is on the rise. As a means for suppressing the influence of generated heat, the heat dissipation properties have been enhanced by making improvements to the shapes and structures of members. For example, in the case of a wire harness for an automobile, electric wires may be flattened to increase the surface areas of the electric wires, or the electric wires maybe arranged in contact with a sheathing member having high thermal conductive properties to increase heat dissipation efficiency. Meanwhile, to enhance the heat dissipation properties, it is also important to enhance the thermal conductive properties of the materials of insulating members such as an electric wire coating and an electric wire sheathing member included in an electric/electronic component.

Mixing a large amount of filler to an organic polymer material and the like make it possible to enhance the thermal conductive properties of the material but mixing a large amount of a filler made of an inorganic compound to an organic polymer material increases the specific gravity of the material, thus making it difficult to reduce the weight of an electric/electronic component. It is important to reduce the weight of an electric/electronic component to be mounted in a product such as an automobile from the viewpoint of reducing the overall weight of the product. Thus, it is desirable to reduce the weight of a material containing thermally conductive fillers. To achieve this, an attempt has been made to reduce the amounts of fillers added.

For maintaining high thermal conductive properties while reducing the amounts of fillers added, the shape of a filler and the filler particle arrangement have been improved. For example, Patent Literature 1 discloses a filler that has avoid therein and has avoid ratio within a predetermined range. Patent Literature 2 discloses an inorganic-organic composite composition obtained by dispersing, in a resin serving as a matrix, boron nitride particles in the form of exfoliated flat particles generated through an exfoliation step of delaminating a secondary particle, which is a laminate of primary particles. Patent Literature 3 discloses a complex having high thermal conductive properties in which fillers having shape anisotropy and high thermal conductive properties are in direct contact with each other and form a network structure in a matrix resin.

CITATION LIST

Patent Literature

Patent Literature 1: JP 2019-1849 A
Patent Literature 2: JP 2012-255055 A
Patent Literature 3: JP 2010-13580 A
Patent Literature 4: JP 2012-122057 A
Patent Literature 5: JP 2015-178543 A
Patent Literature 6: JP 2015-108058 A
Patent Literature 7: JP 2003-221453 A
Patent Literature 8: JP 2014-133678 A
Patent Literature 9: JP 2020-29524 A
Patent Literature 10: JP 2019-123983 A

Non-Patent Literature

Non-Patent Literature 1: Hideo Watanabe et al., "Improvement of dispersibility of nano-silica hollow particles in polymer through surface modification treatment", The Society of Chemical Engineers, Japan, The 40th Autumn Meeting Abstracts, K216, September 2008

SUMMARY OF INVENTION

Problems to be Solved by the Invention

Inorganic compounds typified by alumina, aluminum nitride, and boron nitride have high thermal conductive properties, but have a high specific gravity. Accordingly, when such an inorganic compound is added as a filler to an organic polymer material or the like to form a composite material, it is difficult to achieve high thermal conductive properties while keeping the specific gravity of the overall composite material low. In particular, a filler made of an oxide such as alumina tends to have a high specific gravity. As described in Patent Literatures 1 to 3, the addition amount of the inorganic compound can be reduced to some extent by improving the shape of the filler and the filler particle arrangement, but there are limitation to improvement. If the specific gravity of the filler itself can be reduced by considering the constituent materials of the filler, both weight reduction and high thermal conductive properties of a composite material to which the filler has been added may be effectively achieved together.

For example, if a filler can be formed by combining a material with a low specific gravity, such as hollow particles, and a material with high thermal conductive properties, both weight reduction and high thermal conductive properties of the filler as a whole may be achieved. Materials in which hollow particles such as glass are combined with other materials are disclosed in Patent Literatures 8 to 10, Non-Patent Literature 1, and the like. However, it is not easy to firmly adhere a layer of a substance exhibiting thermal conduction to the surface of a particle of an inorganic compound such as glass particles and to have a thickness sufficient to exhibit thermal conductive properties. If a thermally-conductive substance can be bonded through chemical bonding to the surface of a hollow particle made of glass or the like, it is expected that a layer of the thermally-conductive substance can be firmly fixed to the hollow particle. However, the density of chemical bonds that can be formed directly on the surface of a particle of an inorganic compound such as glass is limited, and the range of influence of the chemical bond is limited to a very thin region of an interface between the particle and the thermally-conductive substance.

In view of this, it is an object of the present invention to provide a thermally conductive filler capable of exhibiting high thermal conductive properties with its specific gravity being reduced, a thermally-conductive composite material and a wire harness that contain such a thermally conductive filler, and a method for manufacturing a thermally conductive filler that can be used to manufacture such a thermally conductive filler.

Solution to Problem

The thermally conductive filler according to the present disclosure contains: a base particle; and a coating layer coating the base particle, in which the coating layer contains: a gel-like substance which coats the surface of the base particle and bonded to the surface of the base particle through chemical bonding, and a thermally-conductive substance that is dispersed inside the gel-like substance and has a higher thermal conductivity and higher specific gravity than the base particle and the gel-like substance.

The thermally-conductive composite material according to the present disclosure contains: the thermally conductive filler; and a matrix material, in which the thermally conductive filler is dispersed in the matrix material.

A wire harness according to the present disclosure contains the thermally-conductive composite material.

A method for manufacturing a thermally conductive filler according to the present disclosure is used to manufacture the thermally conductive filler, and the method includes a gel preparation step of preparing the gel-like substance with the thermally-conductive substance dispersed therein; and a coating step of bonding the gel-like substance, which has been prepared such that the thermally-conductive substance is dispersed therein in the gel preparation step, to the surfaces of the base particles through chemical bonding.

Advantageous Effects of Invention

The thermally conductive filler according to the present disclosure is a thermally conductive filler capable of exhibiting high thermal conductive properties with its specific gravity being reduced. The thermally-conductive composite material and the wire harness according to the present disclosure contain such a thermally conductive filler. The method for manufacturing a thermally conductive filler according to the present disclosure can be used to manufacture such a thermally conductive filler.

BRIEF DESCRIPTION OF DRAWINGS

FIG. 1A shows a thermally-conductive composite material containing a thermally conductive filler, and FIG. 1B is an enlarged illustration of a coating layer contained in the thermally conductive filler.

DESCRIPTION OF EMBODIMENTS

Figure 1:
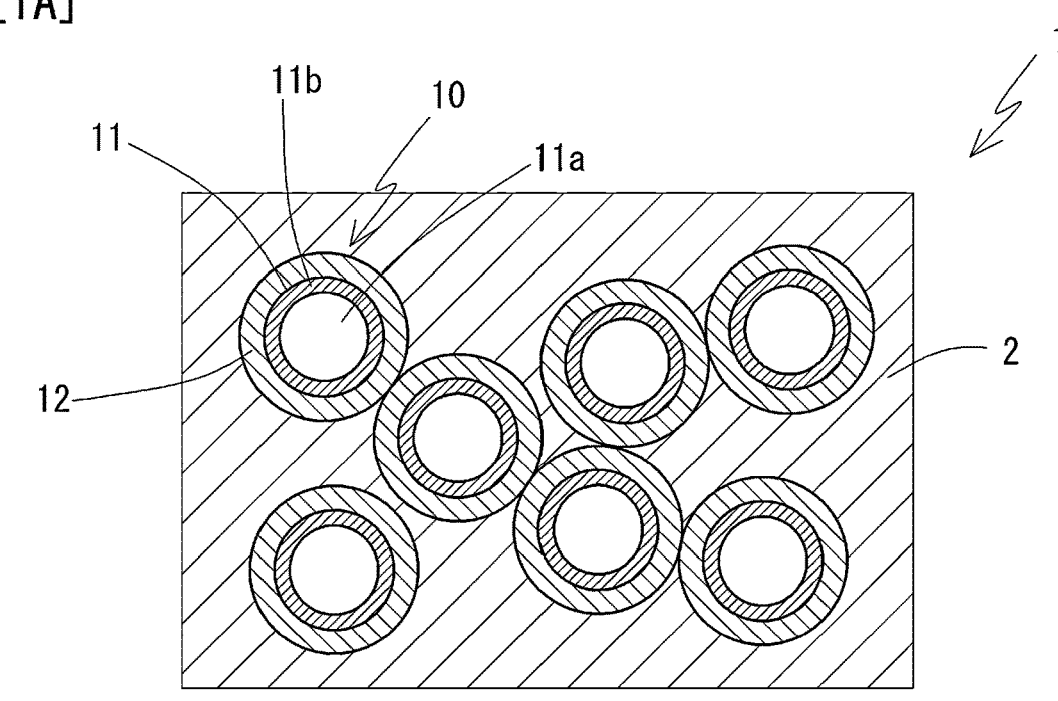
FIGS. 1A and 1B are schematic diagrams illustrating configurations of a thermally conductive filler and a thermally-conductive composite material according to an embodiment of the present disclosure.
Figure 1:
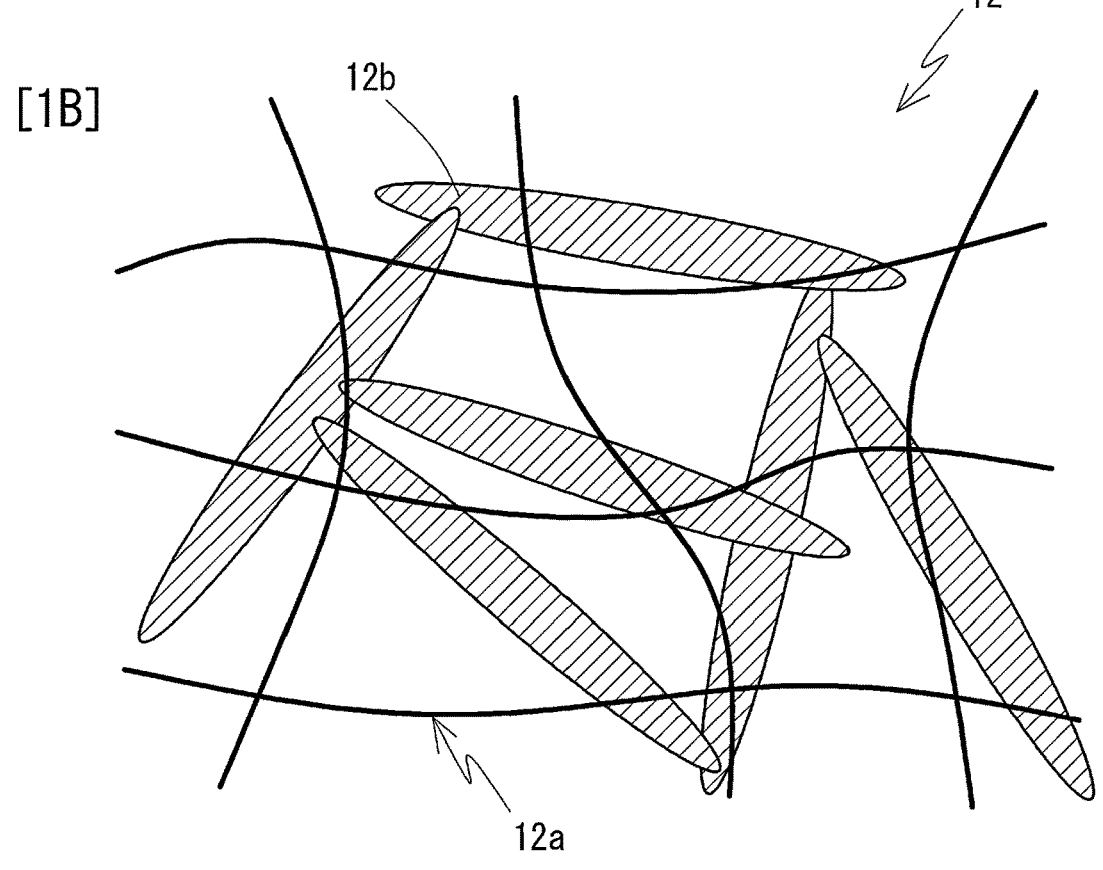

Description of Embodiments of the Present Disclosure

First, embodiments of the present disclosure will be listed and described.

A thermally conductive filler according to the present disclosure contains: a base particle; and a coating layer coating the base particle, in which the coating layer contains: a gel-like substance which coats the surface of the base particle and bonded to the surface of the base particle through chemical bonding, and a thermally-conductive substance that is dispersed inside the gel-like substance and has a higher thermal conductivity and higher specific gravity than the base particle and the gel-like substance.

The thermally conductive filler has a coating layer containing a thermally-conductive substance and a gel-like substance on the surface of the base particle. By using a substance having a lower specific gravity than the thermally-conductive substance as the base particles, the specific gravity of the entire thermally conductive filler can be reduced compared to the case where the entire filler is made of the thermally-conductive substance. On the other hand, the thermally-conductive substance contained in the coating layer, which has higher thermal conductivity than the base particle, contributes to improving the thermal conductive properties of the filler. The gel-like substance contained in the coating layer is a highly viscous substance having a crosslinked structure, and a thermally-conductive substance can be stably retained by being dispersed in the viscous body. The thermally-conductive substance retained in the gel-like substance forms thermal conduction paths within the coating layer of a single filler particle, between adjacent filler particles, and between filler particles and another material surrounding the filler particles, and thus contributes to thermal conduction. Accordingly, even if a base particle or a gel-like substance with low thermal conductivity is used, the thermally conductive filler particle as a whole can exhibit high thermal conductive properties due to the contribution of the thermally-conductive substance retained in the gel-like substance. Thus, the thermally conductive filler can obtain high thermal conductive properties while reducing its specific gravity.

Furthermore, since the gel-like substance contained in the coating layer is chemically bonded to the surface of the base particle, the coating layer is firmly fixed to the surface of the base particle. Since the gel-like substance forms a network due to its crosslinked structure, the entire coating layer is firmly fixed to the base particle along the thickness direction along with the effect of chemical bonding with the base particles, and the fixing state is maintained stable. Accordingly, a layer of a gel-like substance having a thickness sufficient to retain an amount of the thermally-conductive substance necessary to obtain high thermal conductive properties can be formed by firmly bonding to the surface of the base particle, and thus a thermally conductive filler with a low specific gravity and high thermal conductive properties can be obtained stably.

It is preferable that the base particle is hollow. In this case, due to the presence of the hollow portion, the specific gravity of the base particles can be effectively reduced, and the effect of reducing the overall specific gravity of the thermally conductive filler is excellent. Due to the presence of the hollow portion, the thermal conductivity of the base particle decreases, but by providing the coating layer containing the thermally-conductive substance on the surface, it is possible to ensure high overall thermal conductive properties of the thermally conductive filler.

It is preferable that the base particle is a hollow glass particle and has, on its surface, a functional group capable of forming a chemical bond with a functional group of the gel-like substance. A hollow glass body particle having a controlled particle size and shape can be obtained relatively easily and inexpensively. Further, since it is easy to introduce various functional groups onto the surface of the glass particle at a high density using a silane coupling agent, it is easy to obtain a base particle to which the gel-like substance contained in the coating layer can be stably bonded through chemical bonding.

It is preferable that the gel-like substance has a carbonyl group, the base particle has a basic group on its surface, and the gel-like substance is bonded to the surface of the base particle through chemical bonding between the carbonyl group and the basic group. Many substances having a carbonyl group, including polyacrylic acid, polyvinylpyrrolidone, and derivatives thereof, are known to form gels, and can be suitably used as the gel-like substance contained in the coating layer. A carbonyl group can form a chemical bond with a basic group, and therefore by providing the basic group on the surface of the base particle, the coating layer can be bonded to the base particle through chemical bonding.

In this case, it is preferable that the gel-like substance has an organic polymer having a carboxyl group as the carbonyl group. Many organic polymers having a carboxyl group, such as polyacrylic acid, are known to form gels stably, and because of their high versatility, they can be suitably used as the gel-like substance contained in the coating layer of the thermally conductive filler.

It is preferable that the base particle has, on its surface, a primary amino group as the basic group. A primary amino group can form an ionic bond with an acidic carbonyl group such as a carboxyl group to form a salt. A primary amino group can form a covalent bond with a neutral carbonyl group such as a ketone group to form an amide bond or an imide bond. Thus, by forming a primary amino group on the surface of the base particle, the gel-like substance having a carbonyl group can be firmly bonded to the base particle.

It is preferable that the thermally-conductive substance is constituted as a particle having shape anisotropy. A thermally-conductive substance generally exhibits high thermal conductive properties due to its shape anisotropy. However, if a thermally-conductive substance is used as-is as a thermally conductive filler, anisotropy occurs in thermal conduction, and it becomes difficult to effectively contribute to the improvement of thermal conductive properties in any direction. However, by dispersing and retaining such a highly anisotropic thermally-conductive substance in a gel-like substance, anisotropy is less likely to occur in the orientation of the thermally-conductive substance, and thus it is possible to contribute to the thermal conductive properties in each direction with high uniformity. As a result, an excellent thermally conductive filler exhibiting high thermal conductive properties in any direction can be obtained.

In this case, it is preferable that the thermally-conductive substance is a carbon fiber. Carbon fibers have high thermal conductive properties; however, they also have an elongated shape with high anisotropy. Where a carbon fiber is contained in a coating layer and retained by a gel-like substance, it can contribute to forming a thermally conductive filler that exhibits high thermal conductive properties in any direction.

It is preferable that the thermally conductive filler has a specific gravity of 1.8 or lower. In this case, the low specific gravity of the thermally conductive filler can be ensured sufficiently.

A thermally-conductive composite material according to the present disclosure includes: the thermally conductive filler; and a matrix material, in which the thermally conductive filler is dispersed in the matrix material.

The thermally-conductive composite material contains the aforementioned thermally conductive filler according to an embodiment of the present disclosure. Due to the coating layer containing the gel-like substance and the thermally-conductive substance being formed on the surface of the base particle, the thermally-conductive composite material can increase heat dissipation properties with use of the high thermal conductive properties of the thermally conductive filler while reducing the overall specific gravity.

Here, it is preferable that the matrix material contains an organic polymer. Many organic polymers have low thermal conductive properties, but by mixing the thermally conductive filler having a coating layer containing a thermally-conductive substance, the overall heat dissipation properties of the thermally-conductive composite material are kept high. On the other hand, although many organic polymers have a relatively low specific gravity, due to the specific gravity of the thermally conductive filler to be mixed being reduced, the specific gravity of the thermally-conductive composite material can be reduced even where the thermally conductive filler is added.

It is preferable that the thermally-conductive composite material has a specific gravity of 1.4 or lower. In this case, the overall specific gravity of the thermally-conductive composite material is sufficiently reduced.

It is preferable that the thermally-conductive composite material has a thermal conductivity of 0.9 W/(m·K) or higher at room temperature. In this case, the overall thermal conductive properties of the thermally-conductive composite material are kept sufficiently high.

A wire harness according to the present disclosure includes the thermally-conductive composite material.

The wire harness includes the thermally-conductive composite material described above, and thus they can use high thermal conductive properties of the thermally-conductive composite material while reducing the specific gravities of the constituent members. Accordingly, it is possible to achieve high heat dissipation properties while reducing the overall mass of the wire harness. For this reason, even if heat is generated, for example, due to the application of an electric current to electric wires included in the wire harness, it is possible to reduce the influence of the heat with the weight of the wire harness reduced.

A method for manufacturing a thermally conductive filler according to the present disclosure is used to manufacture the thermally conductive filler and includes: a gel preparation step of preparing the gel-like substance with the thermally-conductive substance dispersed therein; and a coating step of bonding the gel-like substance, which has been prepared such that the thermally-conductive substance is dispersed therein in the gel preparation step, to the surfaces of the base particles through chemical bonding.

According to the above-described manufacturing method, a coating layer in which a thermally-conductive substance is dispersed in a gel-like substance is formed on the surface of the base particles, and a thermally conductive filler having a low specific gravity and high thermal conductive properties can be easily manufactured.

Details of Embodiments of the Present Disclosure

Hereinafter, a thermally conductive filler, a thermally-conductive composite material, a wire harness, and a method for manufacturing a thermally conductive filler according to embodiments of the present disclosure will be described in detail with reference to the drawings. The thermally-conductive composite material according to an embodiment of the present disclosure contains the thermally conductive filler according to an embodiment of the present disclosure. Also, the wire harness according to an embodiment of the present disclosure contains the thermally-conductive composite material according to an embodiment of the present disclosure. Furthermore, the thermally conductive filler according to the embodiment of the present disclosure can be manufactured using the manufacturing method according to an embodiment of the present disclosure.

In this specification, various physical property values are measured at room temperature in the atmosphere unless otherwise specified. Also, in this specification, the expression "a component is a main component of a material" refers to a state in which the component makes up 50 mass % or more of the total mass of all components contained in the material. Furthermore, in the present specification, the term "organic polymer" also includes polymers with a low degree of polymerization such as oligomers.

Thermally Conductive Filler

First, the thermally conductive filler (hereinafter simply referred to as a "filler" in some cases) according to an embodiment of the present disclosure will be described.

Overall Configuration

As shown in FIG. 1A, a thermally conductive filler 10 according to an embodiment of the present disclosure contains a base particle 11 and a coating layer 12, and has a particulate shape. The coating layer 12 coats the surface of the base particle 11.

As shown in FIG. 1B, the coating layer 12 contains a gel-like substance 12a and a thermally-conductive substance 12b, with the thermally-conductive substance 12b being dispersed within the layer of the gel-like substance 12a. The coating layer 12 is adhered to the surface of the base particle 11 due to the gel-like substance 12a being bonded to the surface of base particle 11 through chemical bonding. In the gel-like substance 12a, constituent molecules are cross-linked by bonding forces such as hydrogen bonds to form a mesh-like network, so that the gel-like substance 12a shows high viscosity. Particles of the thermally-conductive substance 12b are retained within the structure of the gel-like substance 12a.

The thermally-conductive substance 12b has higher thermal conductivity than the base particle 11 and the gel-like substance 12a. Further, the thermally-conductive substance 12b has a higher specific gravity than the base particle 11 and the gel-like substance 12a. As will be described later, the base particle 11 is preferably formed as a hollow particle or a porous particle. If a region not occupied by solid material, such as a hollow portion in a hollow particle and a hole in a porous particle, is present in the particle, the specific gravity and thermal conductivity of the base particle 11 are defined as amounts for the entire particle, including those regions not occupied by solid material.

Since the filler 10 has a structure in which the coating layer 12 containing the thermally-conductive substance 12b is formed on the surface of the base particle 11, the base particle 11 occupies most of the volume of the filler 10. Since the base particle 11 has a lower specific gravity than the thermally-conductive substance 12b, the overall specific gravity of the filler is lower than the case where the entire filler is made of the thermally-conductive substance 12b.

Meanwhile, the coating layer 12 coating the surface of the base particle 11 contains the thermally-conductive substance 12b having high thermal conductivity, thereby increasing the overall thermal conductive properties of the filler 10. As shown in FIG. 1B, the particles of the thermally-conductive substance 12b dispersed within the coating layer 12 are in contact with each other within the layer, thereby ensuring thermal conductive properties inside the coating layer 12. Furthermore, as shown in FIG. 1A, the coating layers 12 on the surfaces of the filler particles 10 are in contact with the matrix material 2 surrounding the filler particles 10 and the coating layers 12 on the surfaces of other filler particles 10, whereby the thermally-conductive substance 12b contained in the coating layers 12 contributes to thermal conduction between the filler particles 10 and the matrix material 2 and between the filler particles 10. Since the coating layer 12 is provided only on the surface of the base particle 11, the overall volume of the filler particle 10 is ensured by the base particle 11, and the thermally-conductive substance 12b with a small volume can exhibit thermal conductive properties. Contact of the filler particles 10 adjacent to each other via the coating layers 12 as the surface layers forms a thermal conduction path.

The overall specific gravity of the filler 10 is preferably 1.8 or lower, more preferably 1.5 or lower, and even more preferably 1.2 or lower from the viewpoint of avoiding an increase of the mass of the filler 10. On the other hand, when the overall specific gravity of the filler 10 is suppressed excessively, the thermally-conductive substance 12b may not be contained in the coating layer 12 in an amount enough to secure sufficient thermal conductive properties. To avoid this, the overall specific gravity of the filler is preferably 0.5 or higher, and more preferably 0.8 or higher. The specific gravity of the filler 10 can be measured, for example, as the true density of powdered filler 10 using a densimeter.

Base Particle

The base particle 11 has a lower specific gravity than the thermally-conductive substance 12b contained in the coating layer 12, as described above. The specific structure and constituent materials of the base particle 11 are not particularly limited as long as the base particle 11 has such a specific gravity. Examples of the structure of the base particle 11 can include a solid particle whose entire area is filled with solid material, a hollow particle having a hollow portion not occupied by solid material, and a porous body having many fine pores not occupied by solid material. FIG. 1A shows a case where the base particle 11 is a hollow particle having a hollow portion 11a.

If the base particle 11 is constituted as a solid particle, the solid material contained in the base particle 11 needs to have a specific gravity lower than that of the thermally-conductive substance 12b. Suitable examples of such solid material include organic polymers such as various resins, elastomers, and rubbers. Since the gel-like substance 12a needs to be bonded to the surface of the base particle 11 through chemical bonding, if the base particle 11 is made of an organic polymer, the organic polymer preferably has a functional group that can form a chemical bond with the functional group of the gel-like substance 12a. The organic polymer may have such a functional group in its main chain or may have a functional group introduced in its side chain through modification or the like.

If the base particle 11 has a region not occupied by solid material, such as a hollow particle or a porous particle, the overall specific gravity of the base particle 11 is reduced due to the presence of the region. Thus, even in the case where the solid material serving as a constituent material of the base particle 11 has a high specific gravity (density) compared with a base particle 11 which is formed as a solid particle without hollow, the overall specific gravity of the base particle 11 can be kept smaller than that of the thermally-conductive substance 12*b*. Thus, a particle made of various constituent materials can be employed as the base particle 11. In particular, as shown in FIG. 1A, if the base particle 11 is a hollow particle, the hollow portion (cavity) 11*a* not occupied by the solid material is entirely surrounded by a shell 11*b* formed by the solid material, and is secured as a space blocked from the outside environment of the base particle 11. Accordingly, the coating layer 12 having a clearly layered structure is formed on the surface of the base particle 11, and a space not occupied by another substance (hollow portion 11*a*) is obtained, facilitating the persistence of the effect of reducing the specific gravity. From these viewpoints, it is particularly preferable that the base particle 11 is a hollow particle.

If the base particle 11 is formed as a hollow particle or a porous particle, various inorganic materials can be suitably employed as constituent materials in addition to the organic polymers mentioned above in relation with a solid particle. Examples of such inorganic materials include metals and inorganic compounds such as glass and ceramic materials. Various functional groups can be introduced onto the surface of the inorganic material through surface treatment. The gel-like substance 12*a* can be bonded to the surface of the base particle 11 through chemical bonding between these functional groups and the functional groups of the gel-like substance 12*a*.

A preferable example of the inorganic material contained in (the shell 11*b* of) the base particle 11 is glass. Since glass is a material that has a relatively low specific gravity among various inorganic compounds and has higher thermal conductive properties than organic polymers and the like, usage of glass as a material of the base particle 11 contained in the thermally conductive filler 10 leads to high effectiveness in reducing the specific gravity of the thermally conductive filler 10 and increase of the thermal conductive properties thereof. In addition, techniques for producing hollow particles using glass and controlling the size and shape of the particles have already been established, and hollow glass particles can be obtained at a lower cost compared with other types of hollow particles. There is no particular limitation on the type of glass forming the base particles 11, and various types of glass such as soda lime glass, silica glass, borate glass, borosilicate glass, soda lime borosilicate glass, lead glass, and phosphate glass can be used. Of these types of glass, it is preferable, for enabling the introduction of a functional group using a silane coupling agent as will be described later, to use a type of glass that has, in its structure, a silicon atom capable of forming a siloxane bond with a silane coupling agent, such as soda lime glass, silica glass, borosilicate glass, or soda lime borosilicate glass. The material constituting the base particles 11 may be of only one type, or two or more types may be used in combination by mixing or lamination.

The base particle 11 has, on its surface, a functional group capable of forming a chemical bond with a functional group of the gel-like substance 12*a*. There is no particular limitation on the type of functional group of the base particle 11, and it is sufficient that a functional group capable of reacting with the functional group of the gel-like substance 12*a* is provided on the surface of the base particle 11 according to the type of the functional group of the gel-like substance 12*a*. A chemical bond may be an electrostatic bond (ionic bond, hydrogen bond) or a covalent bond. To form an electrostatic bond, it only requires that a polar group having a polarity opposite to the polarity of a polar group of the gel-like substance 12*a* is present on the surface of the base particle 11. The polar group of the base particle 11 may be ionic or nonionic. In many cases, the gel-like substance 12*a* and its raw material are negatively charged, and therefore it is preferable that a positively charged polar group is present on the surface of the base particle 11.

As will be described later, many compounds having a carbonyl group are known as compounds that form gels. Various types of gel-like substances 12*a* can be chemically bonded to the surface of the base particle 11, as long as the base particle 11*a* has on its surface a functional group that can form a chemical bond with a carbonyl group. A basic group is an example of a functional group that can form a chemical bond with a carbonyl group. Basic groups include an amino group, an amide group, an imide group, and the like. Among these, it is preferable that an amino group, and more preferably a primary amino group, is present on the surface of the base particle 11. The formation of chemical bonds between these functional groups and the gel-like substance 12*a* will be described later with an exemplification of the gel-like substance 12*a*.

As long as the base particle 11 has, on at least its surface, a functional group capable of forming a bond with the gel-like substance 12*a*, the distribution and introduction method of the functional group are not particularly limited. That is, the entire solid material constituting the base particle 11 may contain a compound having a polar group as a constituent material, or the functional group may be introduced only onto the surface (and the vicinity thereof) of the base particle 11 made of a material that contains substantially no functional groups or a very small amount of functional groups through surface treatment or the like. From the viewpoint of simplicity in introducing a functional group to the surface of the base particle 11, if the base particle 11 is formed with an organic substance, it is preferable that the organic substance constituting the base particle 11 has a functional group, and the functional group is exposed on the surface of the base particle 11. On the other hand, if the base particle 11 is formed with an inorganic material such as glass, it is preferable to introduce a functional group onto the surface portion by surface treatment. If the base particle 11 is made of glass containing silicon or has a hydroxyl group on its surface, various functional groups can be easily introduced onto the surface by using a silane coupling agent.

The specific shape and particle size of the base particle 11 are not particularly limited. However, it is preferable to have a highly isotropic shape, such as a shape that can be approximated to a sphere, from the viewpoint of facilitating formation of the coating layer 12 on the surface and enhancing affinity with the matrix material 2. The particle size (median diameter D50; the same will be applied below) of the base particles 11 is preferably 1 μm or more, and more preferably 5 μm or more, from the viewpoint of reducing the overall specific gravity of the filler 10. On the other hand, the particle size of the base particles 11 is preferably 100 μm or less, and more preferably 60 μm or less, from the viewpoint of reducing the influence on the properties of the matrix material 2 to which the filler 10 is added, and increasing the specific surface area.

From the viewpoint of reducing the overall specific gravity of the filler 10, it is preferable that the specific gravity of the base particle 11 itself is also low. There is no particular limitation on the specific gravity of the base particles 11 as long as the overall specific gravity of the base particles 11 is lower than the specific gravity of the thermally-conductive substance 12b. The overall specific gravity (true density) of the base particle 11 containing the hollow portion 11a is, for example, 1.0 or less, and preferably 0.5 or less. Although there is no particular limitation to the lowest value for the specific gravity of the base particle 11, the specific gravity the base particle 11 formed as a hollow particle with an inorganic material such as glass or the base particle 11 formed as a solid particle with an organic polymer is generally 0.1 or more.

Coating Layer

In the coating layer 12, the gel-like substance 12a is bonded to the surface of the base particle 11 through chemical bonding while coating the surface of the base particle 11. The thermally-conductive substance 12b is dispersed and retained inside the gel-like substance 12a.

The gel-like substances 12a are bonded together in molecules, forming a network-like crosslinked structure. The bond that forms a crosslinked structure may be a physical bond such as the van der Waals force, but a stronger chemical bond is preferred. The chemical bond may be an electrostatic bond such as ionic or hydrogen bonds, or a covalent bond. From the viewpoint of easiness in forming the coating layer 12, the chemical bond is preferably an electrostatic bond, and more preferably a hydrogen bond from the viewpoint of the stableness of the crosslinked structure.

The gel-like substance 12a has a functional group capable of forming a chemical bond with the functional group on the surface of the base particle 11. The coating layer 12 is formed with the gel-like substance 12a coupled onto the surface of the base particle 11 through the chemical bond between the two functional groups. In the gel-like substance 12a, the functional group that forms a bond with the surface of the base particle 11 may be the same functional group as the functional group forming a crosslinked structure in the molecule or it may be present in the molecule of the gel-like substance 12a as a different functional group from the functional group contributing to cross-linking. Preferably, the common functional group is involved in both intermolecular cross-linking and bonding with the base particles 11. In the gel-like substance 12a having a carbonyl group, which will be described later, the carbonyl group forms bonds in the crosslinked structure and bonds the gel-like substance 12a to the surfaces of the base particle 11 through bonding with a basic group, when a basic group such as amino groups is present on the surface of the base particles 11.

Because the gel-like substance 12a is bonded to the surface of the base particle 11 through chemical bonding, the coating layer 12 is firmly fixed onto the base particle 11. The direct effect of the chemical bond extends only to the interface between the coating layer 12 and the base particle 11 and the vicinity thereof, but the inner layer structure of the gel-like substance 12a is continuous by crosslinking. Accordingly, the chemical bond at the interface and the inner layer structure of the gel-like substance 12a contribute to stably maintaining the fixed coupling of the gel-like substance 12a onto the base particle 11.

Since the gel-like substance 12a forms a network structure and has a high viscosity, when the particles of the thermally-conductive substance 12b are dispersed in the gel-like substances 12a as shown in FIG. 1B, the thermally-conductive substances 12b are stably retained within the layers of the gel-like substances 12a. The gel-like substance 12a generally forms a gel when it contains water or other polar solvents, but even if these polar solvents are removed, the state in which the thermally-conductive substances 12b are dispersed and retained in the structures of the gel-like substances 12a is maintained. Particles of the thermally-conductive substance 12b dispersed in the gel-like substances 12a are in contact with each other to form thermal conduction paths between the particles, whereby the coating layer 12 as a whole exhibits thermal conductive properties.

Since no chemical interaction is required to retain the thermally-conductive substance 12b inside the gel-like substance 12a, the thermally-conductive substance 12b needs not to be compatible with the gel-like substance 12a for allowing disperse and retainment of the thermally-conductive substances 12b in the layers of the gel-like substances 12a. In addition, since the thermally-conductive substance 12b is not fixed to the surface of the base particle 11 by direct interaction with the surface of the base particle 11, the type of the thermally-conductive substance 12b is not restricted by the type of the base particle 11. That is, various thermally-conductive substances 12b can be dispersed in the layers of the gel-like substance 12a and arranged on the surface of the base particle 11, and which can be stably maintained without being limited by the constituent material and shape of the thermally-conductive substance 12b. Also, even when the coating layer 12 is made thick from the viewpoint of improving the thermal conductive properties and the like, the entire coating layer 12 is stably fixed onto the surface of the base particle 11. Similarly, the increase of the content density of the thermally-conductive substance 12b in the coating layer 12 in a degree that the gel-like substance 12a can retain in its structure the thermally-conductive substance 12b, from the viewpoint of improving the thermal conductive properties and the like, can be achieved with relative easiness without being affected by the density of chemical bonds formed.

As for the thickness of the coating layer 12, it is preferable, from the viewpoint of obtaining sufficiently high overall thermal conductive properties of the filler 10, that the coating layer 12 is formed with a thickness such that a ratio of [dry volume of the mixed gel containing the gel-like substance 12a and the thermally-conductive substance 12b]: [dry volume of the base particles 11] is 10:90 or more, more preferably 20:80 or more, and even more preferably 30:70 or more. On the other hand, from the viewpoint of avoiding peeling and damage of the coating layer 12 due to the coating layer 12 being too thick, and difficulty in mixing the filler 10 into the matrix material 2 accompanying these phenomena, it is preferable to reduce the thickness of the coating layer 12 such that the above ratio is 80:20 or less, and more preferably 70:30 or less. Here, the dry volume refers to the volume in a state where liquid components such as solvents including water contained in the gel-like substance 12a are removed through drying or the like. It is preferable that the thickness of the coating layer 12 is generally 1 µm or more, and preferably 5 µm or more, but 30 µm or less.

Note that even if the thermally-conductive substance 12b and the base particles 11 are independently added to the matrix material 2 without using the gel-like substance 12a, the effect of improving the thermal conductive properties can be obtained to some extent. However, in this case, the thermally-conductive substance 12b is dispersed in the matrix resin in a state of coating a very small region of the surface of the base particles 11 or in a state of being independent of the base particles 11. In the filler 10 according to the present embodiment, the gel-like substances 12a are used to stably retain the thermally-conductive substances 12b on the surfaces of the base particles 11, whereby the thermally-conductive substances 12b effectively form a thermally-conductive path.

Gel-Like Substance

There is no particular limitation on the gel-like substance 12a contained in the coating layer 12 as long as it can form a gel state and has a functional group capable of forming a chemical bond with the functional group on the surface of the base particle 11. In the filler 10, the gel-like substance 12a in the coating layer 12 may be swollen due to incorporating of water or another solvent, or may be in a state in which the solvent has been removed through drying or extraction. From the viewpoint of the stability and ease in handling the filler 10, it is preferable that the gel-like substance 12a is in a state where the solvent has been removed.

As the gel-like substance, many substances made of a polymer having a carbonyl group are known, and in the present embodiment as well, these substances can be suitably employed as the gel-like substance 12a. A molecule having a carbonyl group tends to form a stable gel because the carbonyl group has a high polarity. Here, the carbonyl group includes various functional groups having a C=O bond, and may be a ketone group, a carboxyl group, an amide group, an ester group, or the like. For example, polymers having a carboxyl group, such as polyacrylic acid, polymers having an amide group, such as polyvinylpyrrolidone, or derivatives of these compounds swell with water or highly polar solvents and form a stable gel state. Polymers with a ketone group also form a gel upon swelling with polyethylene glycol (PEG). Specific examples of polymers constituting the gel-like substance 12a include polyacrylic acid, polyacrylic acid salts, polyethylene acrylic acid copolymers, polyethylene acrylic acid copolymer salts, polyvinylpyrrolidone, carboxymethyl cellulose, carboxymethyl cellulose salts, alginic acid, and alginates.

If the molecules constituting the gel-like substance 12a have a carbonyl group, when a basic group such as an amino group is present on the surface of the base particle 11, the gel-like substance 12a can be stably bonded to the surface of the base particle 11 through bond formed between the carbonyl group and the basic group. For example, if the gel-like substance 12a has an acidic carbonyl group such as a carboxyl group, it can form an ionic bond with the basic group of the base particle 11 and form a salt. On the other hand, if the gel-like substance 12a has a neutral carbonyl group such as a ketone group, it can form a covalent bond with the basic group on the surface of base particle 11. For example, if a primary amino group is present on the surface of the base particle 11, an amide bond or an imide bond is formed through a condensation reaction.

The specific gravity and thermal conductivity of the gel-like substance 12a are not particularly specified, but in many cases the gel-like substance 12a is composed of an organic substance, and has a specific gravity lower than that of the thermally-conductive substance 12b constituted by an inorganic substance. The specific gravity of the gel-like substance 12a is 1.5 or less, and preferably 1.2 or less in the state of the raw material (gelling polymer) before gelation. Although there is no particular lower limit to the specific gravity, the specific gravity of the organic polymer capable of forming a gel is generally 0.5 or more. Since the gel-like substance 12a has a low specific gravity, the overall specific gravity of the filler 10 can be reduced, along with the effect of the low specific gravity of the base particle 11. Meanwhile, the gel-like substance 12a is generally composed of an organic substance, and its thermal conductivity is lower than that of the thermally-conductive substance 12b. However, as described above, the thermally-conductive substances 12b are dispersed and retained inside the gel-like substance 12a and form a thermally-conductive path, whereby the overall thermal conductive properties of the coating layer 12 are high.

Thermally-Conductive Substance

There is no particular limitation on the type and the shape of thermally-conductive substance 12b contained in the coating layer 12, as long as it has a higher thermal conductivity and a higher specific gravity than the base particle 11 and the gel-like substance 12a, and is dispersible in the gel-like substance 12a. However, from the viewpoint of high thermal conductivity and dispersibility in the gel-like substance 12a, the thermally-conductive substance 12b is preferably constituted by particles of an inorganic substance such as a metal, a metal compound, or a carbon material.

Specific examples of the material forming the thermally-conductive substance 12b include, as metals, non-magnetic metals such as copper and aluminum, and alloys containing these elements as main components. In addition, examples of metal compounds can include oxides, nitrides, carbides, oxynitrides, carbonitrides, carbonates, hydroxides, borides, and the like containing metal elements (including semimetals such as B and Si), as well as metal silicates, aluminates, titanates, and the like. Suitable examples of metal oxides include aluminum oxide, silicon oxide, magnesium oxide, iron oxide, beryllium oxide, titanium oxide, zirconium oxide, and the like, suitable examples of metal nitrides include aluminum nitride, silicon nitride, boron nitride, and the like, suitable examples of metal hydroxides include aluminum hydroxide, magnesium hydroxide, and the like, and suitable examples of metal carbides include silicon carbide and the like. Furthermore, examples of carbon materials that can form the thermally-conductive substance 12b include black lead, carbon flack, carbon fibers, carbon nanotubes, graphite, graphene, and artificial diamond. The thermally-conductive substance 12b contained in the coating layer 12 may be of one type or of multiple types. Also, when using a plurality of types of thermally-conductive substances 12b, these thermally-conductive substances 12b may be mixed or may form a complex. The thermally-conductive substance 12b may be surface-treated with an organic substance or the like, but since no chemical interaction is necessary for retaining the thermally-conductive substance 12b by the gel-like substance 12a, no surface treatment needs to be implemented on the thermally-conductive substance 12b, from the viewpoint of improving the retaining properties of the gel-like substance 12a.

Among those listed above, metal oxides such as aluminum oxide and magnesium oxide, and carbon materials such as carbon black and carbon fibers are particularly preferable as the thermally-conductive substance 12b from the viewpoint of high thermal conductive properties. Also, the thermally-conductive substance 12b is preferably constituted as a particle having shape anisotropy, such as a plate shape, a needle shape, a rod shape, and a fiber shape. Particles composed of a metal compound or carbon materials and having shape anisotropy generally have high thermal conductive properties in a specific direction due to the shape anisotropy. The high thermal conductive properties of these particles make them suitable for use as thermally-conductive materials. Whereas, due to the anisotropy of the particle shape, if the particles are arranged with a specific orientation, the particles show excellent thermal conductive properties in the specific direction, but poor thermal conductive properties in other directions, making them difficult to use as thermally-conductive materials. Meanwhile, in the filler 10 according to the present embodiment, the particles of the thermally-conductive substance 12b are dispersed and retained in the gel-like substances 12a, and therefore in the coating layer 12, particles of the thermally-conductive substance 12b having shape anisotropy are arranged in a random orientation without a specific orientation in the entire filler 10. Thus, by utilizing the high thermal conductive properties of the particles of the thermally-conductive substances 12b having shape anisotropy, the thermally conductive filler 10 can be obtained which shows excellent thermal conductive properties not in a specific direction but in any direction. An example of the thermally-conductive substance 12b having shape anisotropy and high thermal conductive properties is carbon fibers. The carbon fibers have an elongated shape with high anisotropy, and have a large anisotropy in the thermal conductive properties, but the large anisotropy can be eliminated by being dispersed in the gel-like substance 12a, and the carbon fibers can exhibit high thermal conductive properties in any direction by forming a thermal conduction path between adjacent carbon fibers.

The particle size of the thermally-conductive substance 12b is not particularly limited, but the average particle size thereof is preferably 0.1 μm or more, and more preferably 0.3 μm or more, from the viewpoint of exhibiting high thermal conductive properties sufficiently. On the other hand, in the coating layer 12, the average particle size of the thermally-conductive substance 12b is preferably 30 μm or less, and more preferably 20 μm or less, from the viewpoint of being easily dispersed and retained in the structure of the gel-like substance 12a. Moreover, the particle size of the thermally-conductive substance 12b is preferably smaller than the particle size of the base particles 11, and more preferably half or less of the particle size of the base particles 11. Here, the particle size of the thermally-conductive substance 12b refers to the approximate diameter when the particle can be approximated to a spherical shape, and refers to the major diameter (length of the major axis) when the particle has a shape with high anisotropy, such as a needle shape or a fiber shape.

The content of the thermally-conductive substance 12b in the coating layer 12 is not particularly limited, but the thermally-conductive substance 12b is preferably contained in an amount defined by the ratio of [dry volume of gel-like substance 12a]:[dry volume of thermally-conductive substance 12b] is 90:10 or more, more preferably 50:50 or more, and even more preferably 30:70 or more, from the viewpoint of sufficiently enhancing the thermal conductive properties in the coating layer 12, and as a result, causing the filler 10 as a whole to exhibit high thermal conductive properties sufficiently. On the other hand, it is preferable to suppress the content of the thermally-conductive substance 12b to 1:99 or less, and more preferably 10:90 or less in terms of the above ratio, from the viewpoint of stably retaining the thermally-conductive substance 12b inside the structure of the gel-like substance 12a.

Method for Manufacturing Thermally Conductive Filler

Next, a method for manufacturing a thermally conductive filler according to an embodiment of the present disclosure, according to which it is possible to manufacture the thermally conductive filler 10 described above, will be described. The thermally conductive filler 10 can be manufactured by performing a gel preparation step and a coating step.

Prior to manufacturing the thermally conductive filler 10, the base particles 11 are prepared. Many solid particles of organic polymers, hollow particles of inorganic compounds such as glass, and porous particles are commercially available, and these particles may be used as appropriate.

If the base particle 11 does not have, on its surface, a functional group that can form a chemical bond with the functional group of the gel-like substance 12a, then the base particle 11 needs to be surface-treated to introduce a functional group onto its surface. As the surface treatment, a compound having a desired functional group maybe bonded to the surface of the base particle 11 through a chemical reaction. In this case, another compound may be interposed between the compound having a functional group and the surface of the base particle 11. If the base particle 11 is composed of a substance containing a silicon atom, such as glass, or a substance having a hydroxyl group on its surface, a silane coupling agent is preferably used to introduce a functional group onto the surface of the base particle 11.

In the gel preparation step, a mixed gel to be contained in the coating layer 12 is prepared. That is, the gel-like substances 12a are prepared such that the thermally-conductive substances 12b are dispersed therein. Although the specific method is not particularly limited, particles of the thermally-conductive substance 12b may be dispersed in the gel-like substance 12a at the same time as the gel-like substances 12a are formed through cross-linking and swelling of the raw material constituting the gel such as a gelling polymer, or after the gel-like substances 12a are formed. For example, if a gelling polymer that swells with a polar solvent such as water and becomes the gel-like substance 12a is used as a raw material, the particles of the gelling polymer and the thermally-conductive substance 12b may be stirred in a solvent containing a polar solvent such as water. In this case, a small amount of an aqueous metal salt solution may be added to obtain the gel-like substance 12a in a salt state. In the gel preparation step, the addition amounts of the raw material to be the gel-like substance 12a and the thermally-conductive substance 12b need to be selected such that a desired value is obtained as the ratio of [dry volume of gel-like substance 12a (gelling polymer)]:[dry volume of thermally-conductive substance 12b].

In the coating step, the mixed gel prepared in the gel preparation step coats the surfaces of the base particles 11, and the gel-like substance 12a is bonded to the surfaces of the base particles 11 through chemical bonding. At this time, the base particles 11 prepared to have a predetermined functional group on their surfaces and the mixed gel prepared above may be mixed together and kneaded. Alternatively, the base particles 11 and the mixed gel may be mixed in a solvent, with use of a solvent that does not cause adverse effects such as deterioration of the gelling properties of the gel-like substance 12a or modification of the functional groups on the surfaces of the base particles 11. Through the mixing/kneading or mixing operation in a solvent, the mixed gel surrounds the surfaces of the base particles 11, and furthermore, a chemical bond is formed between the functional group of the gel-like substance 12a contained in the mixed gel and the functional group present on the surface of the base particle 11. For the purpose of promoting the formation of the chemical bond, an operation such as heating or addition of a reactant may be performed as appropriate.

The heating temperature is preferably less than or equal to the boiling point of the solvent used.

The particles obtained through the coating step maybe used as the thermally conductive filler 10 as they are or may be used as the thermally conductive filler 10 after removing the liquid component as appropriate. The liquid component can be removed through heating under normal pressure or a vacuum, air drying, or the like. When the liquid component is present on the surfaces of the filler particles 10 in a state such as being taken into the gel-like substance 12a, it is preferable to remove the liquid component if there is a possibility that the liquid component will vaporize and flow during use of the filler 10, reducing the ease of handling the filler 10.

Thermally-Conductive Composite Material

Next, a thermally-conductive composite material (hereinafter simply referred to as a composite material in some cases) according to an embodiment of the present disclosure will be described. A thermally-conductive composite material 1 according to the present embodiment contains the thermally conductive fillers 10 according to the embodiment of the present disclosure described above and the matrix material 2, as shown in FIG. 1. The fillers 10 are dispersed in the matrix material 2.

The composite material 1 according to the present embodiment contains the thermally conductive fillers 10 each having the coating layer 12 in which the thermally-conductive substance 12b is provided on the surfaces of the base particles 11 described above. Thus, due to the high thermal conductive properties of the thermally-conductive substance 12b, the composite material 1 as a whole exhibits high thermal conductive properties and excellent heat dissipation. At the same time, due to the effect of lowering the specific gravity of the thermally conductive filler 10 by the base particles 11, the composite material 1 as a whole has a low specific gravity.

There is no particular limitation on the type of the matrix material 2. The matrix material 2 preferably contains an organic polymer, and more preferably contains an organic polymer as a main component. Specific examples of the organic polymer forming the matrix material 2 include various resins, thermoplastic elastomers, and rubbers. When a resin material is used as the matrix material 2, a curable resin, a thermoplastic resin, or a solvent-soluble plastic may be used in accordance with the desired application. Examples of the resin contained in the matrix material 2 include olefin-based resins such as polyethylene and polypropylene, halogen-based resins such as polyvinyl chloride, polylactic acid, polystyrene-based resins, polyvinyl acetate, ABS resins, AS resins, acrylic resins, methacrylic resins, polyamide resins, urethane resins, silicone resins, fluororesins, polyvinyl alcohol, polyimide, polyacetal, polycarbonate, modified polyphenylene ether (PPE), polyethylene terephthalate, polybutylene terephthalate, polyphenylene sulfide, and epoxy resins, and copolymers of these resins and polymer alloys. The matrix material 2 may contain only one type of organic polymer, or a plurality of organic polymers. It should be noted that the matrix material 2 is not in a gel form, but is in a solid state at room temperature through curing or the like, as appropriate. The matrix material 2 may contain additives such as a flame retardant, a filler, and a coloring agent as appropriate in addition to the organic polymer.

The specific gravity of the matrix material 2 itself is not particularly limited but is preferably reduced to 1.5 or less from the viewpoint of reducing the overall specific gravity of the composite material 1 to which the fillers 10 have been added. No specific lower limit is set for the specific gravity of the matrix material 2. When an organic polymer is used as the matrix material 2, the specific gravity of the material 2 is about 0.8 or more. Also, the thermal conductivity of the matrix material 2 itself is not particularly limited but is preferably set to 0.1 W/(m·K) or more from the viewpoint of keeping the overall thermal conductivity of the composite material 1 to which the fillers 10 have been added high. No specific upper limit is set for the thermal conductivity of the matrix material 2. When an organic polymer is used as the matrix material 2, the thermal conductivity is about 0.6 W/(m·K) or less. It should be noted that the specific gravities of the matrix material 2 and the composite material 1 can be measured using a water replacement method or the like. Also, the thermal conductivities of these materials can be measured using a laser flash method, a hot wire method, and the like.

It is preferable that the content of the filler 10 in the composite material 1 according to the present embodiment is determined as appropriate such that desired overall specific gravity and thermal conductive properties of the composite material 1 are obtained. The larger the content of the filler 10 is, the higher the thermal conductive properties of the composite material 1 are. Therefore, it is preferable that the content of the filler 10 is determined by setting the lower limit of the content at which desired thermal conductive properties are obtained. For example, it is preferable that the content of the filler 10 is determined such that the thermal conductivity of the composite material 1 is 5 or more times, preferably 7 or more times, more preferably 10 or more times, and even more preferably 15 or more times as large as the thermal conductivity of the matrix material 2 free of the filler 10. Alternatively, it is preferable that the content of the filler 10 is determined such that the thermal conductivity of the composite material 1 is 0.9 W/(m·K) or more, preferably 1.5 W/(m·K) or more, more preferably 2.0 W/(m·K) or more, and even more preferably 3.0 W/(m·K) or more. It should be noted that the higher the thermal conductivity of the composite material 1 is, the more preferable it is, but the thermal conductivity of the composite material 1 is, at most, preferably 50 or less times, and more preferably 30 or less times as high as the thermal conductivity of the matrix material 2, or preferably 8.0 W/(m·K) or less, and more preferably 5.0 W/(m·K) or less, from the viewpoint of avoiding an increase in the specific gravity due to addition of an excessive amount of the filler 10.

No specific upper limit is set for the content of the fillers 10 in the composite material 1. The content of the filler 10 is preferably determined such that the specific gravity of the composite material 1 is, at most, 1.3 or less times, and preferably 1.2 or less times as high as the specific gravity of the matrix material 2 free of the filler 10. More preferably, the specific gravity of the composite material 1 is lower than or equal to the specific gravity of the matrix material 2 free of the filler 10. Alternatively, the content of the filler 10 may be determined such that the value of the specific gravity of the composite material 1 is reduced to 1.8 or less, preferably 1.5 or less, and more preferably 1.3 or less. It should be noted that the lower the specific gravity of the composite material 1 is, the more preferable it is, and no specific lower limit is set therefor.

When the content of the filler 10 is specified by the ratio of the filler 10 in the entire composite material 1, the content of the filler 10 is preferably about 10 vol % or more, more preferably 20 vol % or more, and even more preferably 30 vol % or more from the viewpoint of sufficiently improving the thermal conductive properties of the composite material 1. Alternatively, the content of the thermally-conductive substance 12b itself is preferably 2 vol % or more, more preferably 4 vol % or more, and even more preferably 6 vol % or more. On the other hand, the content of the filler 10 is preferably 60 vol % or less, and more preferably 50 vol % or less from the viewpoint of suppressing an increase in the specific gravity of the composite material 1 and from the viewpoint of avoiding saturation of the effect of improving the thermal conductive properties due to the addition of a large amounts of the filler 10. Alternatively, the content of the thermally-conductive substance 12b itself is preferably 15 vol % or less, and more preferably 12 vol % or less.

As described above, the composite material 1 according to the present embodiment has both high thermal conductive properties and a low specific gravity. Accordingly, the composite material 1 can be favorably used as a material contained in a member that requires both lightness in weight and have heat dissipation properties. Specific applications of the composite material 1 are not particularly limited, but next, a case of using it as a constituent material of a wire harness will be described in detail. The composite material 1 according to the present embodiment can be manufactured by mixing the powdery filler 10 manufactured using the above-described manufacturing method to the matrix material 2, at a predetermined blend ratio.

Wire Harness

Figure 2:
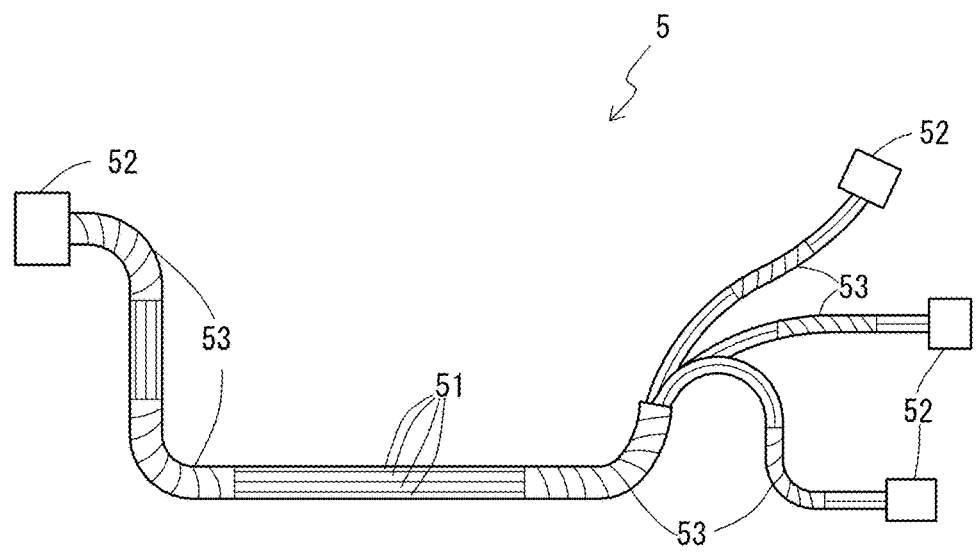
FIG. 2 is a side view of a wire harness according to an embodiment of the present disclosure.

Lastly, a wire harness according to an embodiment of the present disclosure will be described. The wire harness according to the present embodiment contains the above-described thermally-conductive composite material 1 according to the embodiment of the present disclosure. As shown in FIG. 2, a wire harness 5 has a configuration in which a connector 52 with a connection terminal (not shown) is provided at a terminal portion of an insulated electric wire 51 in which an insulating coating coats the outer circumference of a wire conductor. The wire harness 5 may include a plurality of insulated electric wires 51 bundled together. In this case, tape 53 can be used as a sheathing member for bundling the insulated electric wires 51.

In the wire harness 5 according to the present embodiment, the above-described composite material 1 according to the embodiment of the present disclosure can be included in various members that are required to have heat dissipation properties. It is preferable to mainly use the composite material 1 formed by adding the filler 10 to an organic polymer serving as the matrix material 2 in an insulating member. Examples of such an insulating member include an insulating coating included in the insulated electric wire 51, sheathing members such as the tape 53 and a protective tube that are arranged outside the insulated electric wire 51, adhesives used to adhere constituent members or seal a space between constituent members against water, and a connector housing included in the connector 52. The composite material 1 may be arranged between a protective tube such as a corrugated tube and the insulated electric wire 51.

In recent years, in the automotive field, and especially in electric and hybrid vehicles, electric currents applied to electric wires tend to be increased, and the amount of heat generated by the electric wires also tends to be increased accordingly. Also, many electric wires and electric connection members are arranged close to each other. In these cases, it is important that various members included in the wire harness 5 have high heat dissipation properties from the viewpoint of reducing the influence of heat released from the electric wires and electric connection members. In wire harness 5, the constituent members which may be adversely affected by released heat are formed using the above-described composite material 1 having high thermal conductive properties, to thereby dissipate heat efficiently. In addition, weight reduction of constituent members is a critical issue in the automotive field of automobiles. By using the above-described composite material 1 with a reduced specific gravity, it is also possible to reduce the weight of the wire harness 5.

EXAMPLES

Hereinafter, examples will be described. The present invention is not limited to these examples. Here, a thermally conductive filler in which a coating layer coats the surface of a base particle was prepared, and the state of the filler particles and the specific gravity and thermal conductive properties of the composite material containing the filler were evaluated. In the following descriptions, samples were produced and evaluated in the atmosphere at room temperature unless otherwise stated.

[Test Methods]

(1) Production of Filler

First, a plurality of fillers with coating layers coating the surfaces of base particles were produced. To produce a filler, a raw material particle was subjected to surface treatment, a mixed gel was prepared in the gel preparation step, and a coating layer was formed on the surface of the raw material particle in the coating step.

(1-1) Preparation of Base Particles

Hollow glass particles each having an amino group introduced onto its surface were prepared as the base particles. Specifically, soda lime borosilicate hollow glass particles ("Glass Bubbles iM16K" manufactured by 3M; the median diameter was 20 μm; the specific gravity was 0.46) were prepared as untreated hollow glass particles (GB). Then, 5 g of GB and 100 mL of acetone were placed in an eggplant flask and gently stirred at room temperature, and suspended. Furthermore, 0.5 g of 3-aminopropyltriethoxysilane (AP) $((C_2H_5O)_3Si—C_3H_6—NH_2)$ was added to the suspension while stirring was continued. After stirring at room temperature for 2 hours, a cooling tube was attached, 200 mL of pure water was added, and the mixture was stirred at 50° C. for 24 hours. Then, it was filtered, air-dried, and heated in an oven at 140° C. for 24 hours. Through these steps, base particles (AP-GB) surface-treated with aminopropyltriethoxysilane were obtained. Aminopropyltriethoxysilane is bonded to the surfaces of the hollow glass particles through siloxane bonds, and amino groups are bonded to the surfaces of the particles.

(1-2) Gel Preparation Step

The following materials were prepared as gelling polymer materials to serve as raw materials for forming the gel-like substance.

PAA: polyacrylic acid (average molecular weight: approximately 1,000,000; manufactured by Fujifilm Wako Chemicals Co.)

EAA: (ethylene-acrylic acid copolymer; acrylic acid content: 15 mass %; manufactured by Sigma-Aldrich Co., LLC)

Also, the following materials were prepared as thermally-conductive substances.

CF: Carbon fibers (length: 10 μm; diameter: 150 nm; vapor-grown carbon fibers VGCF manufactured by Showa Denko Corporation)

AlO: α-Alumina (diameter: 0.5 μm; manufactured by Fujifilm Wako Chemicals Co.)

MgO: magnesium oxide (diameter: 7 to 15 μm; manufactured by Ube Materials Co., Ltd.)

Each gelling polymer material in the amounts listed in Table 1, 17 ml of tetrahydrofuran (THF), and 33 ml of pure water were placed in an eggplant flask, a reflux tube was attached, then stirring was performed at 60° C. for 12 hours, and the gelling polymer was dissolved and dispersed. With stirring being performed, each thermally-conductive substance was added in the amount shown in Table 1, the reflux tube was attached again, and the mixture was stirred at 60° thermally-conductive substance, and the base particles, and the sum of the calculated volumes. Note that, as will be described later with reference to the micrographs of FIGS. 3A and 3B, it has been confirmed that almost all of the gelling polymer material and the thermally-conductive substance used as raw materials form a mixed gel and coat the surfaces of the base particles, and thus the validity of calculating the dry volume ratio and specific gravity of each component based on the input amount of each raw material as described above is proved.

TABLE 1

| | Mixed gel | | | | | | Dry volume ratio [gelling polymer]:[thermally conductive | Base particles | | | Dry volume ratio [mixed gel]:[base particles] | Filler specific gravity |
|---|---|---|---|---|---|---|---|---|---|---|---|---|
| | Gelling polymer material | | | Thermally conductive substance | | | | | | | | |
| | Type | Specific gravity | Input amount (g) | Type | Specific gravity | Input amount (g) | | Type | Specific gravity | Input amount (g) | | |
| 30-PC80 | PAA | 1.20 | 0.8 | CF | 2.10 | 5.4 | 20:80 | AP-GB | 0.50 | 3.8 | 30:70 | 0.9 |
| 30-PA80 | PAA | 1.20 | 0.5 | AlO | 4.00 | 7.0 | 20:80 | AP-GB | 0.50 | 2.5 | 30:70 | 1.4 |
| 30-PM80 | PAA | 1.20 | 0.6 | MgO | 3.60 | 6.7 | 20:80 | AP-GB | 0.50 | 2.7 | 30:70 | 1.3 |
| 30-EC80 | EAA | 0.98 | 0.7 | CF | 2.10 | 5.5 | 20:80 | AP-GB | 0.50 | 3.8 | 30:70 | 0.9 |
| 30-EA80 | EAA | 0.98 | 0.4 | AlO | 4.00 | 7.0 | 20:80 | AP-GB | 0.50 | 2.6 | 30:70 | 1.4 |
| 30-PC98 | PAA | 1.20 | 0.1 | CF | 2.10 | 6.3 | 2:98 | AP-GB | 0.50 | 3.6 | 30:70 | 1.0 |
| 30-PC90 | PAA | 1.20 | 0.4 | CF | 2.10 | 5.9 | 10:90 | AP-GB | 0.50 | 3.7 | 30:70 | 1.0 |
| 30-PC70 | PAA | 1.20 | 1.2 | CF | 2.10 | 4.9 | 30:70 | AP-GB | 0.50 | 3.9 | 30:70 | 0.9 |
| 30-PC20 | PAA | 1.20 | 3.8 | CF | 2.10 | 1.6 | 80:20 | AP-GB | 0.50 | 4.6 | 30:70 | 0.8 |
| 10-PC80 | PAA | 1.20 | 0.4 | CF | 2.10 | 2.6 | 20:80 | AP-GB | 0.50 | 7.0 | 10:90 | 0.6 |
| 50-PC80 | PAA | 1.20 | 1.0 | CF | 2.10 | 6.9 | 20:80 | AP-GB | 0.50 | 2.1 | 50:50 | 1.2 |
| 70-PC80 | PAA | 1.20 | 1.1 | CF | 2.10 | 7.9 | 20:80 | AP-GB | 0.50 | 1.0 | 70:30 | 1.5 |
| 30NT-PC80 | PAA | 1.20 | 0.8 | CF | 2.10 | 5.6 | 20:80 | GB | 0.46 | 3.6 | 30:70 | 0.9 |

C. for 2 hours to disperse the thermally-conductive substance. Thus, a mixed gel was prepared.

(1-3) Coating Step

With the mixed gel prepared in the gel preparation step being stirred, the amount of base particles (GB or AP-GB without surface treatment) shown in Table 1 was added to the mixed gel, the reflux tube was attached again, and stirring was performed at 60° C. for 2 hours to disperse the base particles. The dispersion was then cooled to room temperature. Then, with 1 L of isopropanol prepared in another beaker being stirred, the dispersion was added little by little therein to form a suspension. Thus obtained suspension was suction filtered and the resulting filtrate was dried at 80° C. for 24 hours. Thus, a thermally conductive filler was obtained.

Table 1 below summarizes the types, specific gravities, and input amounts of the gelling polymer material, the thermally-conductive substance, and the base particles used in the preparation of each thermally conductive filler. Also shown in the table are the dry volume ratio of [gelling polymer]:[thermally-conductive substance], the dry volume ratio of [mixed gel]:[base particles], and the specific gravity of the filler particles as values calculated from the input amounts and the specific gravity. The dry volume ratio of [gelling polymer]:[thermally-conductive substance] is calculated as a ratio obtained by converting the input amounts of the gelling polymer material and thermally-conductive substance into volumes, and the dry volume ratio of [mixed gel]:[base particles] is calculated as the ratio of the calculated total volume of the gelling polymer material and the thermally-conductive substance to the volume of the base particles, and each is expressed with one significant digit. The specific gravity of the filler particles is calculated based on the sum of the input amounts of the gelling polymer, the (2) Preparation of Composite Material Each filler produced as described above was dispersed in a matrix material. Thus, composite materials according to Samples A1 to A14 and Samples B1 to B7 were prepared. Here, a cured product of the following two-component epoxy resin was used as the matrix material contained in the composite materials.

Epoxy base agent: Bisphenol A glycidyl ether ("jER828" manufactured by Mitsubishi Chemical Corporation; epoxy equivalent: 190 g/eq.)

Epoxy curing agent: Amine-type ("ST12" manufactured by Mitsubishi Chemical Corporation; amine value: 345 to 385 KOH mg/g)

Each of the various fillers, the epoxy base agent, and the epoxy curing agent were mixed at the mass ratio shown in Table 2 below in an agate mortar at room temperature, and the mixture was defoamed for 1 minute under vacuum at room temperature. Then, the mixture was heated at 100° C. for 10 minutes using a hot press molding machine and was thus cured. A cured resin product test piece (10 mm×10 mm×1 mm) was produced by cutting a portion of the cured product in which no air bubbles were visually confirmed. Regarding Sample B1, a filler was not added, and the cured resin product test piece was produced using only the epoxy resin.

(3) Evaluation of State of Filler and Properties of Composite Material

Each produced filler was dispersed in liquid paraffin and observed using an optical microscope to evaluate the state of the filler particles.

Also, the specific gravity and thermal conductivity were measured for each cured resin product test piece produced as a composite material as described above. The specific gravity was measured using the water substitution method. The thermal conductivity was measured by a laser flash method using a thermal conduction device ("LFA447" manufactured by NETZSCH). The direction of thermal conductivity measurement was perpendicular to the surface of the cured resin product test piece.

[Test Results]

Figure 3:
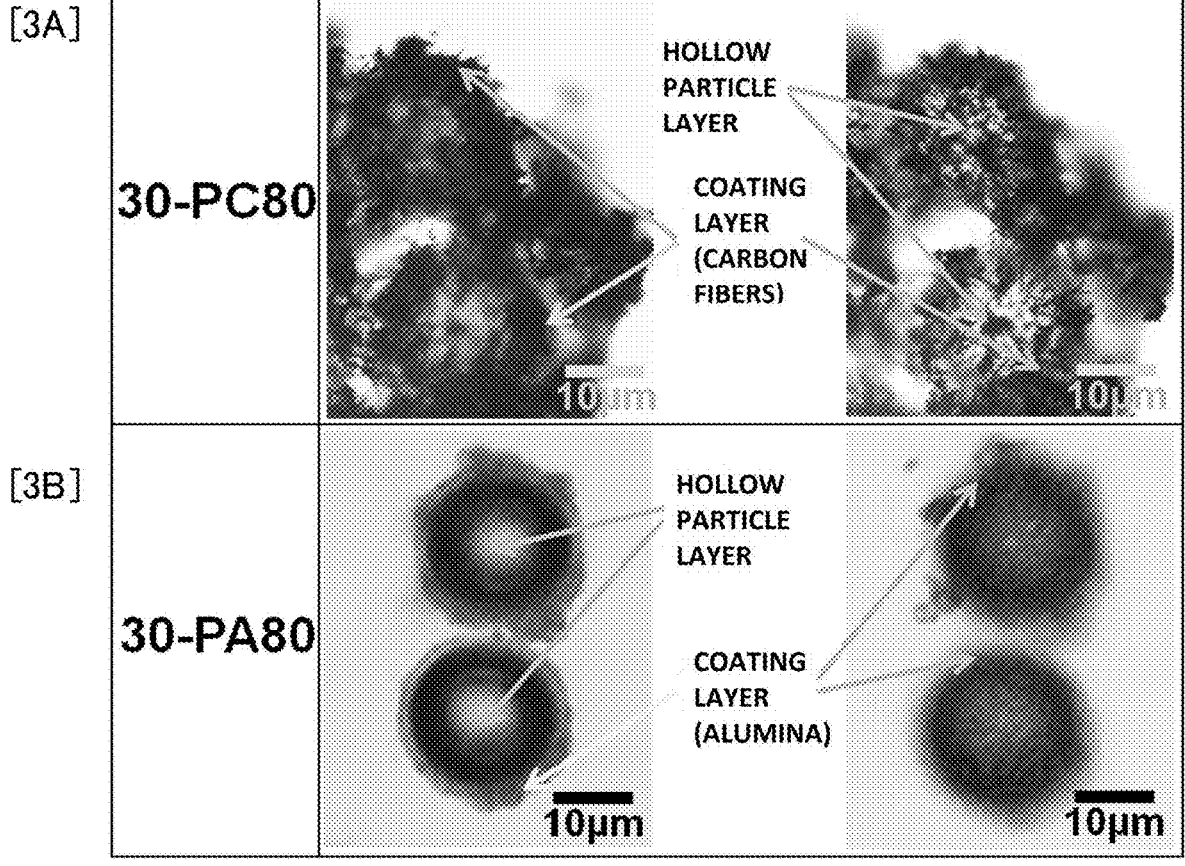
FIGS. 3A and 3B are optical microscope photographs of fillers "30-PC80" and "30-PA80" respectively produced in examples. The photograph on the left focuses on the center of the filler particles, and the photograph on the right focuses on the surface of the filler.

As representatives of the produced fillers, FIGS. 3A and 3B show optical microscope images of fillers "30-PC80" and "30-PA80", respectively. The image on the left is focused on the centers of the particles, and the image on the right is focused on the surfaces of the particles. In both of the two fillers, the base particles remain hollow, as seen in the images focused mainly on the center of the particles. As can be seen in the image focused mainly on the particle surfaces, the region observed as a slightly blurry layer on the surfaces of the hollow base particles corresponds to the coating layer made of the mixed gel. In the image of "30-PC80", the many thorn-like elongated structures in the coating layer correspond to the carbon fibers added as a thermally-conductive substance. Also, in the image of "30-PA80", the many dot-like structures observed as dark shadows in the coating layer correspond to alumina particles added as a thermally-conductive substance.

In this manner, based on the microscopic image, it is confirmed that the produced filler has a structure in which a coating layer made of a mixed gel in which a thermally-conductive substance is dispersed is formed on the surface of the hollow particles serving as the base particles. The mixed gel coats the surfaces of the hollow particles in a layered manner to form a coating layer, and the presence of the gel-like substance has not been confirmed in places other than the surfaces of the particles. That is, almost the entire amount of the mixed gel used as the raw material coats the surfaces of the hollow base particles. Based on this, it is confirmed that a coating layer containing a thermally-conductive substance can be stably formed on the surfaces of the base particles using the method of mixing the surface-treated base particles together with the mixed gel as described above.

In the image of "30-PC80" in FIG. 3A, as described above, in the coating layer, many elongated substances protrude on the surface, and this substance is associated with the carbon fibers added as the thermally-conductive substance. On the surfaces of the base particles, the protrusion directions of the carbon fibers are random, and the carbon fibers are dispersed in the gel-like substance, and thus they do not have a specific orientation.

Table 2 summarizes the measurement results of the composition and properties of the composite materials of Samples A1 to A14 and Samples B1 to B7. The upper row shows the blend ratio (unit: mass %) of the filler and the matrix material, and the middle row shows the filler blend amount (unit: vol %) and the content of the thermally-conductive substance (unit: vol %). Here, the content of the thermally-conductive substance is calculated based on the volume ratio of the thermally-conductive substance in the filler and the blend amount of the filler in the composite material. The lower row summarizes the measurement results of specific gravity and thermal conductivity.

TABLE 2

| | | Thermally conductive substance | Specific gravity | Sample number | | | | | | | | | | |
|---|---|---|---|---|---|---|---|---|---|---|---|---|---|---|
| | | | | A1 | A2 | A3 | A4 | A5 | A6 | A7 | A8 | A9 | A10 | A11 |
| Filler | 30-PC80 | CF | 0.93 | 25 | | | | | | | | | | |
| | 30-PA80 | AlO | 1.38 | | 34 | | | | | | | | | |
| | 30-PM80 | MgO | 1.29 | | | 32 | | | | | | | | |
| | 30-EC80 | CF | 0.91 | | | | 25 | | | | | | | |
| | 30-EA80 | AlO | 1.37 | | | | | 34 | | | | | | |
| | 30-PC98 | CF | 0.97 | | | | | | 26 | | | | | |
| | 30-PC90 | CF | 0.95 | | | | | | | 26 | | | | |
| | 30-PC70 | CF | 0.90 | | | | | | | | 25 | | | |
| | 30-PC20 | CF | 0.76 | | | | | | | | | 22 | | |
| | 10-PC80 | CF | 0.64 | | | | | | | | | | 19 | |
| | 50-PC80 | CF | 1.21 | | | | | | | | | | | 31 |
| | 70-PC80 | CF | 1.49 | | | | | | | | | | | |
| | 30NT-PC80 | CF | 0.90 | | | | | | | | | | | |
| | AP-GB | — | 0.50 | | | | | | | | | | | |
| | CF | CF | 2.10 | | | | | | | | | | | |
| | AlO | AlO | 4.00 | | | | | | | | | | | |
| | Epoxy base agent | | 1.17 | 50 | 44 | 45 | 50 | 44 | 49 | 49 | 50 | 52 | 54 | 46 |
| | Epoxy curing agent | | | 25 | 22 | 23 | 25 | 22 | 25 | 25 | 25 | 26 | 27 | 23 |
| | Filler blend amount (vol %) | | | 30 | 30 | 30 | 30 | 30 | 30 | 30 | 30 | 30 | 30 | 30 |
| | Thermally conductive substance content (vol %) | | | 7.2 | 7.2 | 7.2 | 7.2 | 7.2 | 8.8 | 8.1 | 6.3 | 1.8 | 2.4 | 12.0 |
| | Specific gravity | | | 1.10 | 1.23 | 1.21 | 1.09 | 1.23 | 1.11 | 1.10 | 1.09 | 1.05 | 1.01 | 1.18 |
| | Thermal conductivity (W/m · K) | | | 2.9 | 1.2 | 1.8 | 2.6 | 1.2 | 3.2 | 3.1 | 2.5 | 1.5 | 1.8 | 3.7 |

| | | Thermally conductive substance | Specific gravity | Sample number | | | | | | | | | |
|---|---|---|---|---|---|---|---|---|---|---|---|---|---|
| | | | | A12 | A13 | A14 | B1 | B2 | B3 | B4 | B5 | B6 | B7 |
| Filler | 30-PC80 | CF | 0.93 | 8 | 44 | | | | | | | | |
| | 30-PA80 | AlO | 1.38 | | | | | | | | | | |
| | 30-PM80 | MgO | 1.29 | | | | | | | | | | |
| | 30-EC80 | CF | 0.91 | | | | | | | | | | |
| | 30-EA80 | AlO | 1.37 | | | | | | | | | | |

TABLE 2-continued

| | | | | | | | | | | | | |
|---|---|---|---|---|---|---|---|---|---|---|---|---|
| 30-PC98 | CF | 0.97 | | | | | | | | | | |
| 30-PC90 | CF | 0.95 | | | | | | | | | | |
| 30-PC70 | CF | 0.90 | | | | | | | | | | |
| 30-PC20 | CF | 0.76 | | | | | | | | | | |
| 10-PC80 | CF | 0.64 | | | | | | | | | | |
| 50-PC80 | CF | 1.21 | | | | | | | | | | |
| 70-PC80 | CF | 1.49 | 35 | | | | | | | | | |
| 30NT-PC80 | CF | 0.90 | | | | | | | | | | 25 |
| AP-GB | — | 0.50 | | | | | 16 | | | | | |
| CF | CF | 2.10 | | | | | | 13 | | 43 | | |
| AlO | AlO | 4.00 | | | | | | | 21 | | 60 | |
| Epoxy base agent | | 1.17 | 43 | 61 | 37 | 67 | 56 | 58 | 53 | 38 | 27 | 50 |
| Epoxy curing agent | | | 22 | 31 | 19 | 33 | 28 | 29 | 26 | 19 | 13 | 25 |
| Filler blend amount (vol %) | | | 30 | 10 | 50 | 0 | 30 | 30 | 30 | 30 | 30 | 30 |
| Thermally conductive substance content (vol %) | | | 16.8 | 2.4 | 12.0 | 0.0 | 0.0 | 7.2 | 7.2 | 30.0 | 30.0 | 7.2 |
| Specific gravity | | | 1.25 | 1.15 | 1.05 | 1.17 | 0.97 | 1.27 | 1.41 | 1.61 | 2.12 | 1.09 |
| Thermal conductivity (W/m · K) | | | 4.1 | 1.7 | 3.4 | 0.2 | 0.2 | 0.6 | 0.3 | 2.4 | 1.2 | 0.8 |

Samples A1 to A14 were obtained by forming fillers by providing a coating layer in which a thermally-conductive substance was dispersed in a gel-like substance on the surface of base particles to which amino groups had been introduced through surface treatment, and adding the fillers to the matrix material. In these Samples A1 to A14, despite the addition of a maximum of 50 vol % of filler, the specific gravity of the composite material is reduced to, at most, the specific gravity of Sample B1, which is free of filler, or to an increase of 10% or less relative to the specific gravity of Sample B1.

All of the Samples A1 to A14 have a thermal conductivity of 1.5 W/(m·K) or higher. These values correspond to 7 times or more the thermal conductivity of Sample B1 to which no filler is added. Based on these results, in Samples A1 to A14, in which a filler was added, the filler being obtained by providing a coating layer on the surface of a base particle and the coating layer being obtained by dispersing a thermally-conductive substance in a gel-like substance, due to the filler containing hollow base particles with a low specific gravity, it can be seen that high thermal conductivity can be obtained while reducing the overall specific gravity of the composite material to which the filler is added. The coating layer stably retains the thermally-conductive substance in the structure of the gel-like substance, and the gel-like substance forms chemical bonds with the base particles, whereby the thermally-conductive substance is dispersed, and thus it can be interpreted that the state in which the base particles are coated with the coating layer exhibiting high thermal conductive properties is stably formed. It is conceivable that particles of the thermally-conductive substance retained in a dispersed state in the gel-like substance come into contact with each other within the coating layer, thereby forming a continuous thermally-conductive path on the surface of each filler particle. In addition, it is interpreted that, due to the effect of the volume occupied by the base particles, the coating layers on the surfaces of the adjacent fillers come into contact with each other, forming a thermal conduction path between the filler particles, which is highly effective in improving thermal conductivity.

Here, Samples B2 to B5 will be considered. In Sample B2, the surface-treated hollow glass particles (AP-GB) are added to the matrix material, and the specific gravity is lower than that of Sample B1 to which no filler is added. However, since the filler does not contain a thermally-conductive substance, the thermal conductivity is not improved compared to Sample B1. The thermal conductivity of the glass itself is about 1.0 W(m·K), which is higher than the thermal conductivity of the matrix material, but since the particles are hollow and contain air bubbles, it is interpreted that phonons are scattered inside the particles and thermal conduction via the particles is less likely to occur. Thus, the hollow glass particles themselves cannot be used as thermally conductive fillers.

As the thermally-conductive substance, carbon fibers were added to Sample B3, and alumina particles were added to Sample B4 at 7.2 vol %, respectively. This addition amount is the same as the content of the thermally-conductive substances in Samples A1 to A5. However, these Samples B3 and B4 have a thermal conductivity of 0.6 W/(m·K) or less. Sample B3 uses the same thermally-conductive substance as Samples A1 and A4, and Sample B4 uses the same thermally-conductive substance as Samples A2 and A5, but the thermal conductivities obtained in Samples B3 and B4 are respectively ¼ or less those of Samples A1 and A4, and Samples A2 and A5. This is thought to be because, in Samples B3 and B4, the filler occupies a small volume in the composite material, whereby the contact area between the filler particles is small, and the formation of a thermal conduction path between the filler particles is not effectively achieved. In particular, it is thought that a thermal conduction path along the fiber axis direction, which is effective in improving the measured thermal conductivity, is not effectively formed in the thickness direction of the test piece since the carbon fibers used in Sample B3 have high shape anisotropy, and in the press-molded resin cured test piece, the fiber axis direction is oriented in the in-plane direction of the test piece, which is orthogonal to the direction in which the thermal conductivity is measured.

In Samples B5 and B6, carbon fibers and the alumina are added alone as the thermally-conductive substances, in the same manner as in Samples B3 and B4, but the blend amount is increased to 30 vol %. This blend amount is the same as that of the Samples A1 to A5 as the filler blend amount (volume ratio occupied by the filler). These Samples B5 and B6 have greatly improved thermal conductivity compared to Sample B1 to which no filler is added. This result indicates that the contact area between the filler particles was increased and an effective thermal conduction path was formed by increasing the addition amount of the thermally-conductive substance compared to Samples B3 and B4.

However, due to the increased volume occupied by the thermally-conductive substance, the specific gravity of the composite material is nearly 1.4 times that of Sample B1, or even greater. Sample B5 uses the same thermally-conductive substance as Samples A1 and A4, Sample B6 uses the same thermally-conductive substance as Samples A2 and A5, and these sets are compared with each other. In Samples B5 and B6, although the content of the thermally-conductive substance is greater by four times or more, the obtained thermal conductivities are not improved compared to those of Samples A1 and A4 and Samples A2 and A5, and the Sample B5 in which carbon fibers are used has rather low thermal conductivity. Thus, based on the results of Samples B3 to B6, it can be said that it is difficult to achieve both low specific gravity and high thermal conduction when using a filler composed solely of a thermally-conductive substance such as carbon fibers or alumina. In particular, it can be said that when a thermally-conductive substance with high shape anisotropy such as carbon fiber is used alone, it is difficult to control the anisotropic orientation of the thermally-conductive substance to achieve high thermal conductive properties in the desired direction.

In Sample B7, in addition to the thermally-conductive substance, base particles and a gel-like substance are used to form the filler, and the base particles used are hollow glass particles that have not been surface-treated. This Sample B7 contains the same amount of carbon fibers as Samples A1, A4 and Sample B3 as a thermally-conductive substance, but the thermal conductivity of Sample B7 is considerably smaller than the values of Samples A1 and A4 in which the gel-like substance is used, and is close to the value of Sample B3, in which carbon fibers are added alone as the thermally-conductive substance. In this Sample B7, since the base particles do not have functional groups capable of forming chemical bonds with the gel-like substance on the surface, it is thought that the coating layer is not strongly bonded to the surfaces of the base particles via chemical bonds. Correspondingly, it is thought that in Sample B7, the thermally-conductive substance is not stably maintained in a state of coating the surfaces of the base particles when dispersed in the gel-like substance, but rather the thermally-conductive substance coats very small regions of the surfaces of the base particles, or is dispersed in the matrix resin independently of the base particles.

Finally, Samples A1 to A14 will be compared with each other. First, in the set of Samples A1 to A3 and in the set of Samples A4 and A5, the types of thermally-conductive substances used are different from each other. When these samples are compared with each other, the thermal conductivities of Samples A1 and A4, in which carbon fibers are used as a thermally-conductive substance, are significantly higher than those of the other samples, in which alumina particles or magnesium oxide particles are used. This corresponds to the fact that carbon fibers have higher thermal conductive properties than alumina or magnesium oxide. Carbon fibers have high shape anisotropy, and as described for Sample B3 above, although they exhibit high thermal conductive properties in the direction along the oriented fiber axis, the effect of improving the thermal conductive properties is limited in other directions. However, as shown in the micrographs of FIG. 3A, by dispersing the carbon fibers in a gel-like substance, the carbon fibers are randomly dispersed in the coating layer and blended with the matrix resin, whereby the influence of the anisotropic shape can be reduced, and excellent thermal conductive properties can be exhibited in any direction.

The set of Samples A1 and A4 and the set of Samples A2 and A5 differ in the type of gelling polymer material used. However, when the thermal conductivities of these sets are compared, the thermal conductivity does not change significantly, regardless of which gelling polymer material is used. Thus, it can be said that the type of gel-like substance does not have a significant effect on the thermal conductive properties of the obtained filler as long as the thermally-conductive substance can be dispersed and retained therein.

In Samples A1 and A6 to A9, in the mixed gel used as the raw material of the coating layer, the amounts of carbon fibers added as a thermally-conductive substance to the gel-like substance (dry volume ratio of [gelling polymer]: [thermally-conductive substance]) are different from each other, and correspondingly, the contents of the thermally-conductive substance are different from each other. In terms of highest content of the thermally-conductive substance, the order is Sample A6, A7, A1, A8, and A9, and the thermal conductivity of the composite material is highest in the same order. That is, the greater the content of the thermally-conductive substance in the filler is, the greater the effect of improving thermal conductive properties is. In Sample A8, the dry volume ratio of [gelling polymer]:[thermally-conductive substance] is 30:70, and in the region where the content of the thermally-conductive substance is higher than that, a thermal conductivity of at least 2.0 W/(m·K) is obtained.

In Samples A1 and A10 to A12, the amounts of the mixed gel used relative to the base particles (the dry volume ratio of [mixed gel]:[base particles]) are different from each other, and thus the contents of the thermally-conductive substances are different from each other. In terms of highest content, the order is Sample A12, A11, A1, and A10, and the specific gravity of the composite material and the thermal conductivity are highest in the same order. That is, the larger the proportion of the coating layer in the filler is, and the thicker the coating layer is, the greater the effect of improving the thermal conductive properties is. In Sample A1, the dry volume ratio of [mixed gel]:[base particles] is 30:70, and in the region where the coating layer occupies a larger proportion than that, a high thermal conductivity of at least 2.0 W/(m·K) is obtained.

Samples A1, A13, and A14 differ from each other in the amount of the filler added to the composite material. In terms of highest addition amount of the filler, the order is Sample A14, A1, and A13, and the specific gravity of the composite material and the thermal conductivity are highest in the same order. That is, the effect of improving the thermal conductivity increases as the amount of filler added increases. High thermal conductivity of at least 2.0 W/(m·K) was obtained in Samples A1 and A14 in which the addition amount of the filler exceeded 20 vol %. However, even if the filler content is increased to 50 vol % or more as in Sample A14, the effect of improving the thermal conductivity is limited.

Although embodiments of the present disclosure have been described in detail above, the present invention is by no means limited to the above embodiments, and various modifications are possible without departing from the gist of the present invention.

LIST OF REFERENCE NUMERALS 1 (Thermally-conductive) composite material
10 (Thermally-conductive) filler
11 Base particle (hollow particle)
11a Hollow portion 11*b* Shell
12 Coating layer
12*a* Gel-like substance
12*b* Thermally-conductive substance
2 Matrix material
5 Wire harness
51 Insulated electric wire
52 Connector
53 Tape

The invention claimed is:

1. A thermally conductive filler comprising:
a base particle; and
a coating layer coating the base particle,
wherein the coating layer comprises:
a gelatinous substance which coats a surface of the base particle and bonded to the surface of the base particle through chemical bonding; and
a thermally-conductive substance that is dispersed inside the gelatinous substance and has a higher thermal conductivity and higher specific gravity than the base particle and the gelatinous substance.

2. The thermally conductive filler according to claim 1, wherein the base particle is hollow.

3. The thermally conductive filler according to claim 2, wherein the base particle is a hollow glass particle and has, on its surface, a functional group capable of forming a chemical bond with a functional group of the gelatinous substance.

4. The thermally conductive filler according to claim 1, wherein the gelatinous substance has a carbonyl group, the base particle has a basic group on its surface, and the gelatinous substance is bonded to the surface of the base particle through chemical bonding between the carbonyl group and the basic group.

5. The thermally conductive filler according to claim 4, wherein the gelatinous substance has an organic polymer having a carboxyl group as the carbonyl group.

6. The thermally conductive filler according to claim 4, wherein the base particle has, on its surface, a primary amino group as the basic group.

7. The thermally conductive filler according to claim 1, wherein the thermally-conductive substance is constituted as a particle having shape anisotropy.

8. The thermally conductive filler according to claim 7, wherein the thermally-conductive substance is a carbon fiber.

9. The thermally conductive filler according to claim 1, having a specific gravity of 1.8 or lower.

10. A thermally-conductive composite material comprising:
the thermally conductive filler according to claim 1; and
a matrix material,
wherein the thermally conductive filler is dispersed in the matrix material.

11. The thermally-conductive composite material according to claim 10,
wherein the matrix material comprises an organic polymer.

12. The thermally-conductive composite material according to claim 10, having a specific gravity of 1.4 or lower.

13. The thermally-conductive composite material according to claim 10, having a thermal conductivity of 0.9 W/(m·K) or higher at room temperature.

14. A wire harness, comprising
the thermally-conductive composite material according to claim 10.

15. A method for manufacturing a thermally conductive filler capable of being used to manufacture the thermally conductive filler according to claim 1, the method comprising:
a gel preparation step of preparing the gelatinous substance with the thermally-conductive substance dispersed therein; and
a coating step of bonding the gelatinous substance, which has been prepared such that the thermally-conductive substance is dispersed therein in the gel preparation step, to the surfaces of the base particles through chemical bonding.

16. The thermally conductive filler according to claim 1, wherein the base particle is a hollow glass particle and has, on its surface, a functional group which forms a chemical bond with a functional group of the gelatinous substance.

17. The thermally conductive filler according to claim 1, wherein the chemical bonding is an ionic bond, a hydrogen bond, or a covalent bond.

18. The thermally conductive filler according to claim 1, wherein the gelatinous substance has a network-type structure formed through a chemical bonding.

* * * * *